Sept. 5, 1961 B. I. ULINSKI 2,998,980
VERTICALLY MOVING AXLE FOR INDUSTRIAL TRUCK
Filed Feb. 3, 1959 3 Sheets-Sheet 1
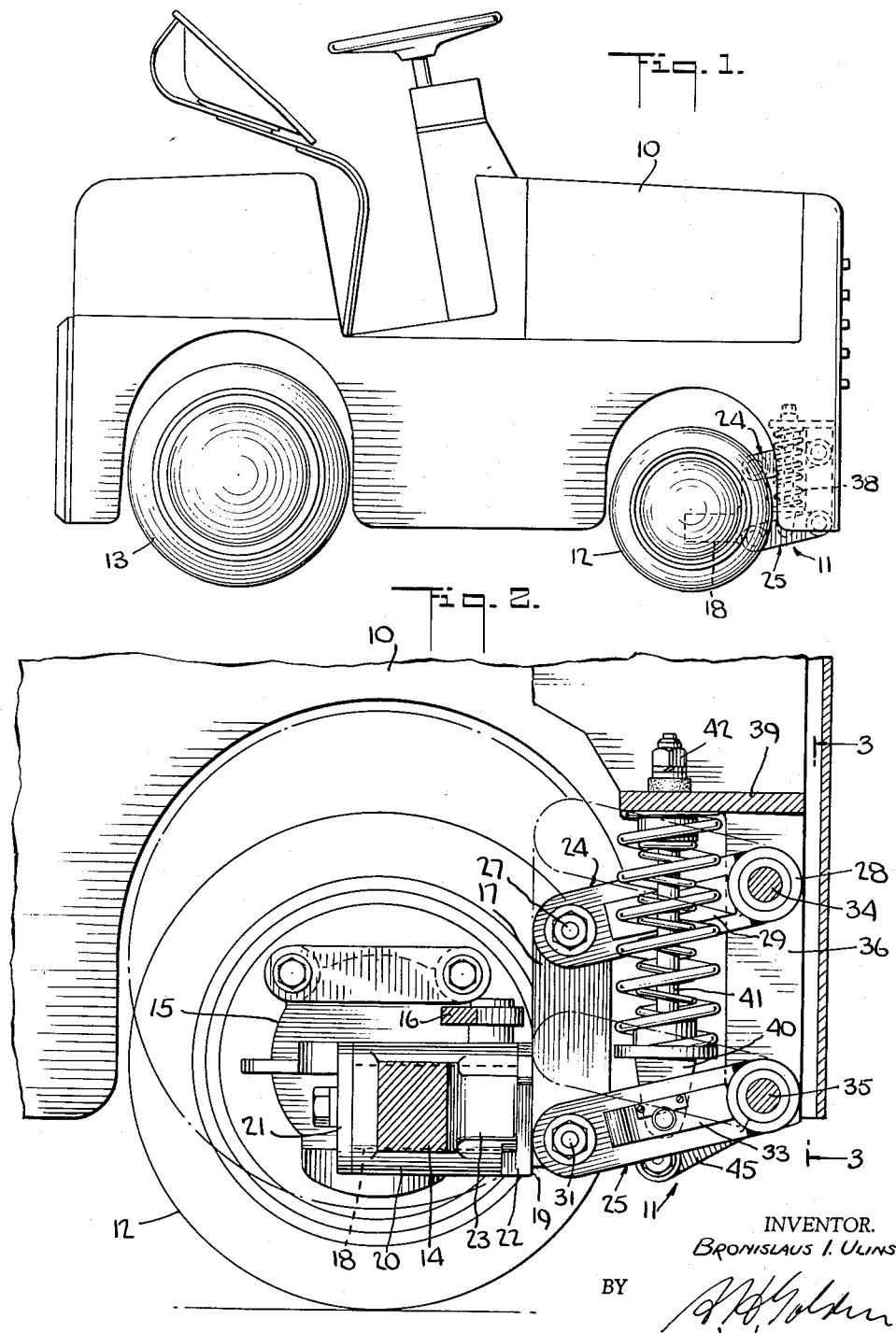
INVENTOR.
BRONISLAUS I. ULINSKI
BY
ATTORNEY Sept. 5, 1961    B. I. ULINSKI    2,998,980
VERTICALLY MOVING AXLE FOR INDUSTRIAL TRUCK
Filed Feb. 3, 1959    3 Sheets-Sheet 2
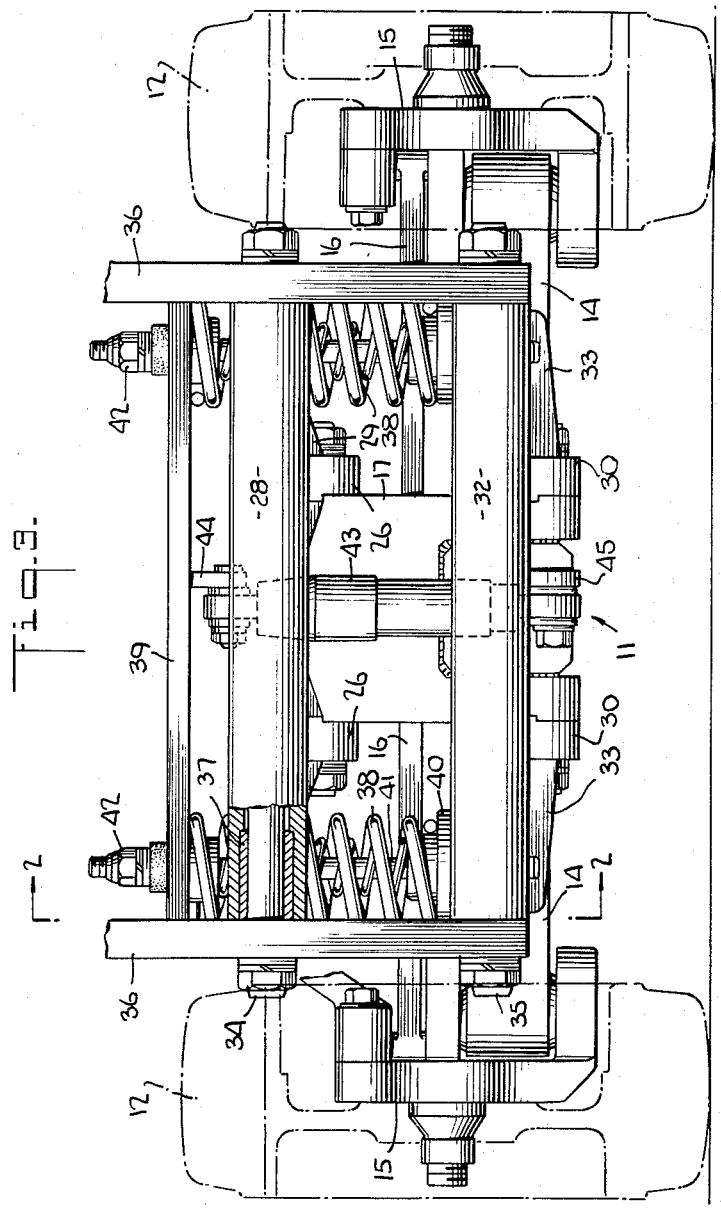
INVENTOR.
BRONISLAUS I. ULINSKI
BY
ATTORNEY Sept. 5, 1961  B. I. ULINSKI  2,998,980
VERTICALLY MOVING AXLE FOR INDUSTRIAL TRUCK
Filed Feb. 3, 1959  3 Sheets-Sheet 3
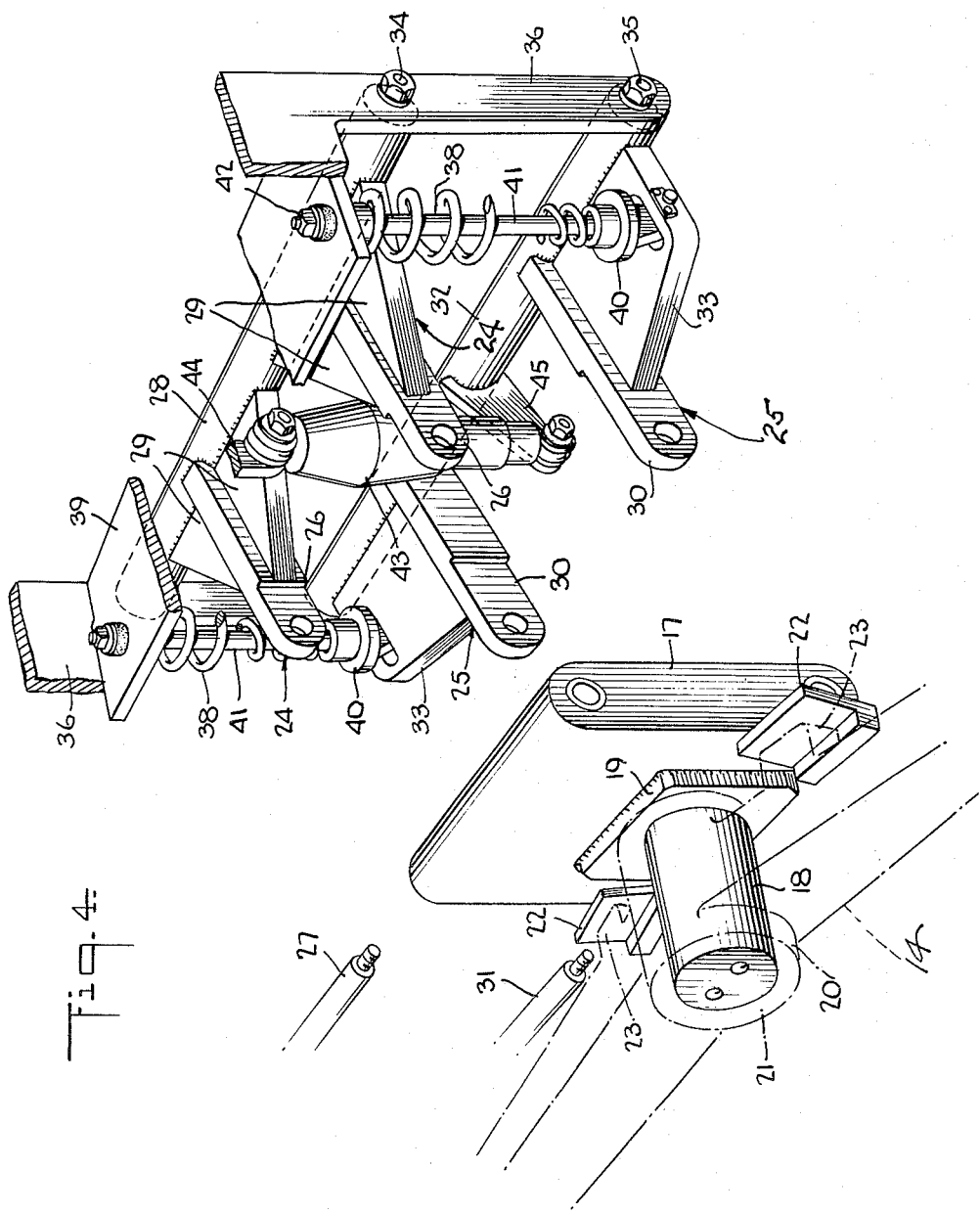
INVENTOR.
BRONISLAUS I. ULINSKI
BY
ATTORNEY

United States Patent Office 2,998,980
Patented Sept. 5, 1961

2,998,980
VERTICALLY MOVING AXLE FOR INDUSTRIAL TRUCK
Bronislaus I. Ulinski, Flossmoor, Ill., assignor to The Yale and Towne Manufacturing Company, Stamford, Conn., a corporation of Connecticut
Filed Feb. 3, 1959, Ser. No. 790,828
4 Claims. (Cl. 280—112)

This invention relates to a vertically moving axle for an industrial truck.

Those persons skilled in the art will appreciate that industrial trucks frequently are equipped with an axle that allows the wheels at opposed ends of the axle to move vertically, so that the truck can move more readily over an irregular surface. A very considerable problem is involved in designing such an axle and its mounting, because of the very severe space limitations on an industrial truck and because the axle must carry very heavy loads. Where the wheels are steering wheels, the necessary wheel mountings and steering mechanism will impose restrictions on the axle design if the wheels are to have the kind of steering operation that is desired in an industrial truck. It also is difficult, in a truck of the particular class, so to construct the axle as to allow relatively large amount of vertical wheel movement.

The prior art contains many examples of industrial truck axles that are pivoted to effect vertical movement of the wheels, one of those axles being shown in my earlier Patent No. 2,829,903. The axle shown in that patent operates rather well, but nevertheless is limited in some respects as to the vertical wheel action. Sometimes industrial trucks must be designed to operate over relatively rough terrain, and it is then necessary to have a better vertical wheel action if the truck is to operate satisfactorily. So far as I am aware, the prior art has not been successful in designing an axle that will operate well in a truck of the particular class, when the truck is to move over rough ground. I have now conceived by my invention a novel vertically moving axle that very well meets the requirements of an axle in an industrial truck, while achieving an extremely satisfactory wheel action that will facilitate the movement of the truck over very rough ground, or even over a relatively high obstruction on the ground.

As an important feature of my invention, I mount my axle through means that extend in the longitudinal axis of the truck, while effective to support the axle for both rocking and bodily vertical movements. The axle mounting then requires relatively little space on the truck, while the wheels at the ends of the axle can have a relatively large amount of vertical movement.

More particularly, I utilize an axle mounting member that is arranged in the truck axis at merely one side of the axle, as at the front of the axle, with means whereby the axle can rock on that member. Then, I support the axle mounting member through parallelogram links, with those links preferably extending from the member in a direction away from the axle so that the links and mounting member are substantially aligned in the truck axis. While rocking on its mounting, the axle also can move bodily in a vertical direction on the parallelogram links, so that the wheels at opposed ends of the axle will move through a rather large vertical distance, either in unison or independently of one another. I utilize spring means so acting through the links that the wheel action will be yielding, whether the wheels move independently or in unison.

Despite the very considerable vertical wheel movement that can be achieved, my novel construction will require relatively little space on the truck. Thus, with the axle mounting longitudinally arranged, I do not require for the mounting any space above the axle or near the ends of the axle. That space is left available for other parts of the industrial truck, and for steering mechanism should steering be desired. I can in fact equip the axle with steering wheels and steering mechanism like those shown in my patent to which I have already referred.

I have thus outlined rather broadly the more important features of my invention in order that the detailed description thereof that follows may be better understood, and in order that my contribution to the art may be better appreciated. There are, of course, additional features of my invention that will be described hereinafter and which will form the subject of the claims appended hereto. Those skilled in the art will appreciate that the conception on which my disclosure is based may readily be utilized as a basis for the designing of other structures for carrying out the several purposes of my invention. It is important, therefore, that the claims be regarded as including such equivalent constructions as do not depart from the spirit and scope of my invention, in order to prevent the appropriation of my invention by those skilled in the art.

Referring now to the drawings:

FIG. 1 shows an industrial truck that utilizes my novel vertically moving axle;

FIG. 2 is a cross-section taken on the line 2—2 in FIG. 3, showing my construction in greater detail;

FIG. 3 is a section taken on the line 3—3 in FIG. 2;

FIG. 4 is an exploded perspective view showing parts of my invention.

Referring more particularly to FIG. 1 of the drawings, I show an industrial truck 10 that utilizes my novel axle construction, indicated generally by the numeral 11, to mount steering wheels 12 relatively to the truck. The details of the industrial truck 10 generally are not important to an understanding of my invention, but I may call attention to the fact that the steering wheels 12 support one end of the truck, while the opposed end of the truck can be supported on rather usual drive wheels 13.

As a part of my novel construction, I utilize between the wheels 12 an axle 14, best seen in FIGS. 2 and 3. In the arrangement that I prefer and that I show in the drawings, the axle 14 is like that shown in my Patent No. 2,829,903. Thus, the opposed ends of axle 14 are equipped with wheel mountings 15 that rotate to steer the wheels 12, with a tie member 16 extending between the wheel mountings 15 and moving over axle 14 as the wheels are steered through a very wide angle.

In my invention, I support the axle 14 through an axle mounting member 17 that I place in a position at one side of the axle 14, that being the front side in the truck I have chosen to illustrate. The axle mounting member 17 has an integral pivot portion 18, best seen in FIG. 4, that may be separately formed and then secured in position with its base 19 welded in an opening in member 17. To coact with the pivot portion 18, the axle 14 is formed with a bearing portion 20, FIGS. 2 and 4, much like that shown in my earlier patent. An end plate 21 is secured to the pivot portion 18 to hold the axle 14 assembled in position to rock on its mounting member 17 in the longitudinal axis of the truck. At each opposed side of the pivot portion 18, I prefer to equip the axle mounting member 17 with angular stop portions 22 that will coact with lugs 23 on the axle 14. The arrangement is such that the stop portions 22 will limit relatively to the mounting member 17 the extent of the rocking movements of axle 14, and also may accept from the axle forces that are due to a movement of either wheel 12 against an obstruction.

Referring to FIGS. 1 and 2 of the drawings, I utilize upper and lower parallelogram links 24, 25, that are pivoted to the axle mounting member 17, and that extend from member 17 longitudinally of the truck in a direction away from the axle 14. As shown in more detail in FIG. 4, the upper parallelogram link 24 includes a pair of arms 26 that will be pivoted at one end to the axle mounting member 17 through a pivot 27. The arms 26 then will extend from pivot 27 in a medial position between the wheels 12. The opposed end of the upper link 24 is relatively wide, with the arms 26 welded to a bearing sleeve 28 that extends across a large part of the truck width, as will be clearly seen in FIG. 3. Plate portions 29 are welded between the arms 26 and sleeve 28, FIG. 4, whereby the upper parallelogram link 24 will be very rigid.

I prefer to make the lower parallelogram link 25 quite similar to the upper link 24, with a pair of arms 30 pivoted to the axle mounting member 17 through a pivot 31, and a relatively wide portion including a long bearing sleeve 32 welded to the arms 30. Between the arms 30 and sleeve 32 I weld plate portions 33, to which I shall refer again.

The upper and lower parallelogram links 24, 25 are mounted relatively to the truck through shafts 34, 35, FIGS. 3 and 4, that are engaged in the bearing sleeves 28 and 32, and that are supported between side portions 36 on the truck frame. Both opposed ends of the bearing sleeves 28, 32 then are juxtaposed to the frame portions 36, enabling the upper and lower links 24, 25 to receive bearing support at points that actually are at each side of the truck frame. At those points, the sleeves 28, 32 may if desired be equipped with particular bearings 37, one of which is shown in FIG. 3. The importance of that construction will be better understood when it is realized that the parallelogram links 24, 25 thereby can be so spaced relatively to the wheels 12 as to allow clearance for very wide angle steering, yet those links can very readily accept forces that may be applied in a transverse direction when a wheel meets an obstruction to its movement.

It will of course be understood that the links 24, 25 form with the frame portions 36 and the axle mounting member 17 a parallelogram on which the axle 14 can move bodily in a vertical direction, and on which the axle also can rock relatively to member 17. To control the axle movements, I utilize a pair of coil spring assemblies 38, best seen in FIG. 4, that act against opposed sides of the lower parallelogram link 25. Each spring assembly 38 is engaged between a bracket 39 on the truck frame and a spring base 40 that is pivoted to the reinforcing plate 33 at each corresponding side of link 25. A guide rod 41 extends from each spring base 40 within the springs and is adapted to slide in an opening in the bracket 39 during the vertical movement of the parallelogram links 24, 25. A nut 42 is assembled on the upper end of each guide rod 41 so that the bracket 39 will act as a stop for the downward movement of links 24, 25.

Naturally, the spring assemblies 38 will contribute a yielding wheel action when both wheels 12 move in unison. However, I call attention to the fact that the yielding action will be effective when merely one wheel moves vertically. That is because the axle 14 then will act as a lever on its pivot 18, whereby to move that pivot through yielding of the springs 38.

I prefer to equip my novel construction with a shock absorber 43, FIG. 4, that is attached at one end to a lug 44 on the bracket 39, and at its opposed end to a lever 45 welded to the bearing sleeve 32 on the lower parallelogram link 25. I believe it will be unnecessary to describe the shock absorber 43 in detail, since that shock absorber is rather conventional and will merely dampen the spring action, as will be understood by those persons skilled in the art.

From the description that I have made, it will be seen that my invention will enable me to equip an industrial truck with a vertical wheel action that will be very effective and that will facilitate to a considerable extent the movement of the industrial truck over very rough ground. As a matter of fact, I have found that an industrial truck equipped with my novel axle mounting can very easily be driven across a railroad track that rests on the surface of the ground, while reducing to a great extent the vertical movement of the truck and enabling the drive wheels of the truck to remain in tractive engagement with the ground.

It is exceedingly important to realize that my novel construction, while achieving an exceedingly valuable vertical wheel action, nevertheless will leave ample clearance for other parts of the truck, and will fully meet the requirements of an axle in an industrial truck. That will be better appreciated when it is realized that the axle mounting member 17 is extremely narrow but very rigid, and is carried by parallelogram links 24, 25, that in turn are quite rigid in their vertical alignment with the longitudinal axis of the truck. Further, because mounting 17 is at one side of axle 14, it actually is possible to utilize the axle shown in my earlier patent, to which I have referred, enabling the wheels to be steered through an extremely wide angle, and with the tie member 16 moving over the axle 14 whereby to occupy little space in the truck. It is important to observe that my novel wheel mounting construction leaves free not only the space above the axle 14, but also the space near opposed ends of the axle. Thus, it is possible to achieve the extremely wide angle steering that is important in an industrial truck, with ample clearance between the wheels and the mounting of the axle. In addition, my construction is very well adapted to accept very large forces, including those forces that will tend to twist the axle in a horizontal direction, should the wheels meet an obstruction.

While I have described the particular value of my novel construction when utilized with steering wheels, I do not wish to limit myself to steering wheels since my construction will have a very positive value when used in any industrial truck in which it is desired to achieve an effective vertical wheel action, while making possible a considerable clearance space around an axle and near the ends of the axle.

I believe that those persons skilled in the art will now understand the very considerable advantages of my novel axle construction, and will fully appreciate the value of my novel contribution to the industrial truck art.

I now claim:

1. In a truck of the class described, an axle extending transversely of the truck and having a wheel mounted to rotate at each opposed end thereof, an axle mounting member at one side of said axle and also extending transversely of the truck, said member being narrow relatively to the width of the truck, a shaft extending from said axle mounting member in the longitudinal axis of the truck, said axle rocking on said shaft whereby the wheels move independently of one another in a vertical direction, upper and lower parallelogram links pivoted at one end thereof to each side of said mounting member and extending longitudinally of the truck, each of said parallelogram links being pivoted at its opposed end to the truck frame whereby to support the axle mounting member and axle for vertical movement bodily relatively to the truck, said links being positioned substantially inward of the wheels at the end of the axle, yielding means opposing said bodily vertical movement of the axle and axle mounting member, and said yielding means effective by yielding to facilitate vertical movement of the wheels separately and in unison as one or both wheels move over a relatively high obstructing surface on the ground.

2. In a truck of the class described, an axle having a wheel mounted for steering movement at each opposed end thereof, means for steering said wheels, an axle mounting member positioned transversely of the truck at one side of said axle, said mounting member being narrow relatively to the space between said wheels, means mounting the axle for rocking movement on said mounting member, upper and lower parrallelogram links pivoted at one end thereof to each side of said axle mounting member, and means pivoting the other ends of said parallelogram links to the truck frame with the links extending longitudinally of the truck frame and intermediate said wheels and the ends of said transversely positioned axle mounting member.

3. In a truck of the class described, an axle having a wheel mounted for steering movement at each opposed end thereof, a relatively narrow plate-like mounting member for said axle arranged transversely of the truck, upper and lower parallelogram links each having a narrow end pivoted to said axle mounting member, the opposed ends of said parallelogram links having a relatively wide portion, bearing means mounting the said opposed ends of said parallelogram links for pivotal movement on said truck whereby to support the axle for vertical movement relatively to the truck frame, and the said wide link portion enabling the parallelogram links to accept forces incidental to a movement of a wheel against an obstruction while the narrow portions of said links allow clearance for wide angle steering of the wheels.

4. In a truck of the class described, an axle having a wheel mounted to rotate at each opposed end thereof, a mounting member juxtaposed to a medial portion of said axle at one side thereof, pivot means between said medial portion of the axle and the mounting member to support the axle for rocking movement, said mounting member and pivot means leaving free a space above the axle, upper and lower parallelogram links pivoted to the mounting member and extending from said member in a direction away from the axle, so as to be aligned longitudinally of the truck relatively to said mounting member and axle, means pivoting the parallelogram links to the truck frame to support the axle for bodily vertical movement, while holding the axis of the pivot means on which the axle rocks in predetermined aligned relation to the truck axis, spring means acting through the axle mounting member to oppose the vertical axle movement, and said spring means yielding to allow each wheel to have a relatively large vertical movement as the axle rocks and moves bodily on its mounting.

References Cited in the file of this patent

UNITED STATES PATENTS

| | | |
|---|---|---|
| 748,015 | Roberts | Dec. 29, 1903 |
| 1,345,421 | Van Vleet | July 6, 1920 |
| 1,418,613 | Bement | June 6, 1922 |
| 2,070,775 | Bell | Feb. 16, 1937 |
| 2,242,453 | Cochran | May 20, 1941 |

FOREIGN PATENTS

| | | |
|---|---|---|
| 477,411 | Great Britain | Dec. 29, 1937 |